(12) United States Patent
Zhai et al.

(10) Patent No.: US 12,516,837 B2
(45) Date of Patent: Jan. 6, 2026

(54) AIR MICROORGANISM ENRICHMENT DEVICE IN FARMS

(71) Applicants: Institute of Animal Health, Guangdong Academy of Agricultural Sciences, Guangzhou (CN); Agro-Biological Gene Research Center, Guangdong Academy of Agricultural Sciences, Guangzhou (CN)

(72) Inventors: Shaolun Zhai, Guangzhou (CN); Chunling Li, Guangzhou (CN); Yan Li, Guangzhou (CN); Xia Zhou, Guangzhou (CN); Ming Liao, Guangzhou (CN); Mingfei Sun, Guangzhou (CN); Jianfeng Zhang, Guangzhou (CN); Huahua Kang, Guangzhou (CN); Wenkang Wei, Guangzhou (CN); Ting Yu, Guangzhou (CN)

(73) Assignee: Institute of Animal Health, Guangzhou (CN)

( * ) Notice: Subject to any disclaimer, the term of this patent is extended or adjusted under 35 U.S.C. 154(b) by 422 days.

(21) Appl. No.: 18/095,564

(22) Filed: Jan. 11, 2023

(65) Prior Publication Data
US 2024/0138364 A1    May 2, 2024

(30) Foreign Application Priority Data
Oct. 26, 2022   (CN) .......................... 202222826992.6

(51) Int. Cl.
*A01K 1/00*    (2006.01)
*F24F 11/30*   (2018.01)
*F24F 11/52*   (2018.01)
*G01N 1/22*    (2006.01)

(52) U.S. Cl.
CPC .............. *F24F 11/30* (2018.01); *F24F 11/52* (2018.01); *G01N 1/2273* (2013.01)

(58) Field of Classification Search
CPC .......... F24F 11/30; F24F 11/52; G01N 1/2273
See application file for complete search history.

(56) References Cited

U.S. PATENT DOCUMENTS

2016/0235874 A1*   8/2016   Blakeman ............... A61L 2/202
2017/0065736 A1*   3/2017   Blakeman ................. A61L 2/14

* cited by examiner

Primary Examiner — Charles R Kasenge
(74) Attorney, Agent, or Firm — Terry M. Sanks, Esq.; Beusse Sanks, PLLC

(57) ABSTRACT

Disclosed is an air microorganism enrichment device in farms. The device comprises a shell, a collection assembly, an air extraction component, a flow monitoring component, a display component and a processing component, wherein the collection assembly is detachably arranged on the shell and can fix the relative position with the shell; the collection assembly is provided with a collection cavity, a collection air inlet and a collection air outlet, and is used for collecting microorganisms introduced in the air; the air extraction component communicates with the collection air outlet; the flow monitoring component monitors the exhaust flow of an air outlet pipeline and sends a flow signal; and the processing component is in communication connection with the flow monitoring component and the display component, and the processing component receives the flow signal and transmits the flow signal to the display component to display exhaust flow information.

9 Claims, 3 Drawing Sheets

AIR MICROORGANISM ENRICHMENT DEVICE IN FARMS

TECHNICAL FIELD

The present disclosure relates to the technical field of air microorganism collection, in particular to an air microorganism enrichment device in farms.

BACKGROUND

By collecting and monitoring microorganisms in air in the farm, whether the air environment in the farm meets the breeding requirements can be judged, so that the breeders can treat the microorganisms in time to create a good breeding environment. Usually, an air microorganism collection device is used for collecting microorganisms in air, such as a device recorded in the patent of a liquid impact type air microorganism sampler with the publication number of CN202631299U. However, the device cannot timely and accurately judge the air extraction flow rate of the air pump, so that the device is inconvenient to use.

SUMMARY

The present disclosure aims to provide an air microorganism enrichment device in farms so as to solve the problems existing in the prior art. The air collection flow rate is convenient to timely and accurately judge, the purposes of enriching air microorganisms in farms and facilitating pathogen detection are achieved, and then data support is provided for early warning and forecasting of pathogenic microorganisms in farms.

In order to achieve the above-mentioned purpose, the present disclosure adopts the following technical scheme.

The present disclosure provides an air microorganism enrichment device in farms. The air microorganism enrichment device in farms comprises a shell, a collection assembly, an air extraction component, a flow monitoring component, a display component and a processing component, wherein the collection assembly is detachably arranged on the shell and can fix the relative position with the shell, the collection assembly is provided with a collection cavity and an air outlet pipeline, the collection assembly is provided with a collection air inlet which communicates with the collection cavity and is used for air to enter, one end of the air outlet pipeline communicates with the collection cavity, a collection air outlet for discharging air is formed in the other end of the air outlet pipeline, and the collection cavity is used for collecting introduced microorganisms in air; the air extraction component is arranged on the shell, and an air extraction opening of the air extraction component is used for communicating with the collection air outlet; the flow monitoring component is arranged on the air outlet pipeline and used for monitoring the exhaust flow rate on the air outlet pipeline and sending a flow signal; the display component is arranged on the shell; and the processing component is arranged on the shell, the processing component is in communication connection with the flow monitoring component and the display component, and the processing component is used for receiving the flow signal and transmitting the flow signal to the display component to display exhaust flow information.

Preferably, a placing groove is formed in the side wall of the shell, and the collection assembly can be placed in the placing groove and fix the relative position with the shell.

Preferably, the side wall of the shell is fixedly provided with a first fixed component, the collection assembly is provided with a second fixed component, and the first fixed component and the second fixed component are detachably connected and can fix the relative positions of the collection assembly and the shell.

Preferably, the collection assembly further comprises a collection bottle and an air inlet pipeline, the collection bottle is provided with the collection cavity, and the collection cavity is used for accommodating collection liquid; one end of the air inlet pipeline is the collection air inlet, the other end of the air inlet pipeline passes through the collection cavity and extends into the collection liquid, and the end, away from the collection air outlet, of the air outlet pipeline extends into the collection cavity and is located above the collection liquid.

Preferably, the collection bottle comprises a bottle body and a bottle cap, the bottle cap and the bottle body are detachably arranged at an opening in the upper part of the bottle body and can seal the opening; and the air inlet pipeline and the air outlet pipeline pass through the bottle cap in a sealed manner and extend into the collection cavity.

Preferably, the collection air inlet of the air inlet pipeline is set as a bell mouth with a large-diameter end facing outward.

Preferably, an accommodating cavity is formed in the shell, the air extraction component, the flow monitoring component and the processing component are all arranged in the accommodating cavity, and the air outlet pipeline passes through the shell into the accommodating cavity and communicates with the air extraction component.

Preferably, the air microorganism enrichment device in farms further comprises a timing module, wherein the timing module is arranged in the accommodating cavity and is in communication with the processing component, and the timing module is used for timing the air extraction component and displaying the timing through the display component.

Preferably, the air microorganism enrichment device in farms further comprises a power supply module, wherein the power supply module is arranged in the accommodating cavity and used for providing electric energy require by the air extraction component, the flow monitoring component, the display component, the processing component and the timing module.

Preferably, the air microorganism enrichment device in farms further comprises a switch button and a timing button which are arranged on the shell, wherein both the switch button and the timing button are in communication connection with the processing component, the air extraction component is in communication connection with the processing component, the switch button is used for controlling the opening and closing of the air extraction component, and the timing button is used for controlling the opening and closing time of the air extraction component.

Compared with the prior art, the present disclosure has the following technical effects.

In the air microorganism enrichment device in farms provided by the present disclosure, the collection assembly is detachably arranged on the shell and can fix the relative position with the shell. When in use, the collection assembly can be fixed on the shell, and then the position of the shell in the farm can be fixed without additionally fixing the position of the collection assembly, or the collection assembly is detached from the shell to flexibly adjust the position of the collection assembly, or the microorganisms in the collection cavity are detected after the collection assembly is detached. In the using process, the air extraction component operates to extract air, so that the collection air inlet of the collection assembly extracts air from the farm, and the microorganisms in the air are enriched into the collection cavity. Then, the air without microorganisms after being filtered is extracted through the air outlet pipeline by the air extraction component. The flow monitoring component monitors the exhaust flow rate in the air outlet pipeline and transmits the exhaust flow rate to the processing component. The processing component displays the exhaust flow information through the display component. The exhaust flow rate in the air outlet pipeline, namely the exhaust flow rate of the air extraction component, is convenient for operators to timely and accurately judge, so that the exhaust flow rate can meet the collection requirements. And then, the purposes of enriching air microorganisms in farms and facilitating pathogen detection are achieved, subsequent data processing such as microorganism content calculation is facilitated, and data support is provided for early warning and forecasting of pathogenic microorganisms in farms.

BRIEF DESCRIPTION OF THE DRAWINGS

In order to illustrate the technical scheme in the embodiment of the present disclosure or in the prior art more clearly, the attached figures needing to be used in the embodiment are simply described. Apparently, the embodiments in the following description are merely a part rather than all of the embodiments of the present disclosure. For those skilled in the art, under the premise of without contributing creative labor, other attached figures further can be obtained according to these attached figures.

Reference signs: 1, air microorganism enrichment device in farms; 10, shell; 11, placing groove; 12, second fixed component; 20, collection assembly; 21, collection cavity; 22, air outlet pipeline; 23, collection air inlet; 24, collection air outlet; 25, collection bottle; 251, bottle body; 252, bottle cap; 26, air inlet pipeline; 30, air extraction component; 40, flow monitoring component; 50, display component; 60, processing component; 70, timing module; 80, power supply module; 90, switch button; and 100, timing button.

DETAILED DESCRIPTION OF THE EMBODIMENTS

The technical schemes according to embodiments of the present disclosure are clearly and completely described in the following with reference to the attached figures in the present disclosure. Apparently, the embodiments in the following description are merely a part rather than all of the embodiments of the present disclosure. Based on the embodiment in the present disclosure, all other embodiments obtained by the ordinary technical staff in the art under the premise of without contributing creative labor belong to the scope protected by the present disclosure.

The present disclosure aims to provide an air microorganism enrichment device in farms so as to solve the problems existing in the prior art. The air collection flow rate is convenient to timely and accurately judge, the purposes of enriching air microorganisms in farms and facilitating pathogen detection are achieved, and then data support is provided for early warning and forecasting of pathogenic microorganisms in farms.

To make the foregoing objective, features, and advantages of the present disclosure clearer and more comprehensible, the present disclosure is further described in detail below with reference to the attached figures and specific embodiments.

Embodiment I

Figure 1:
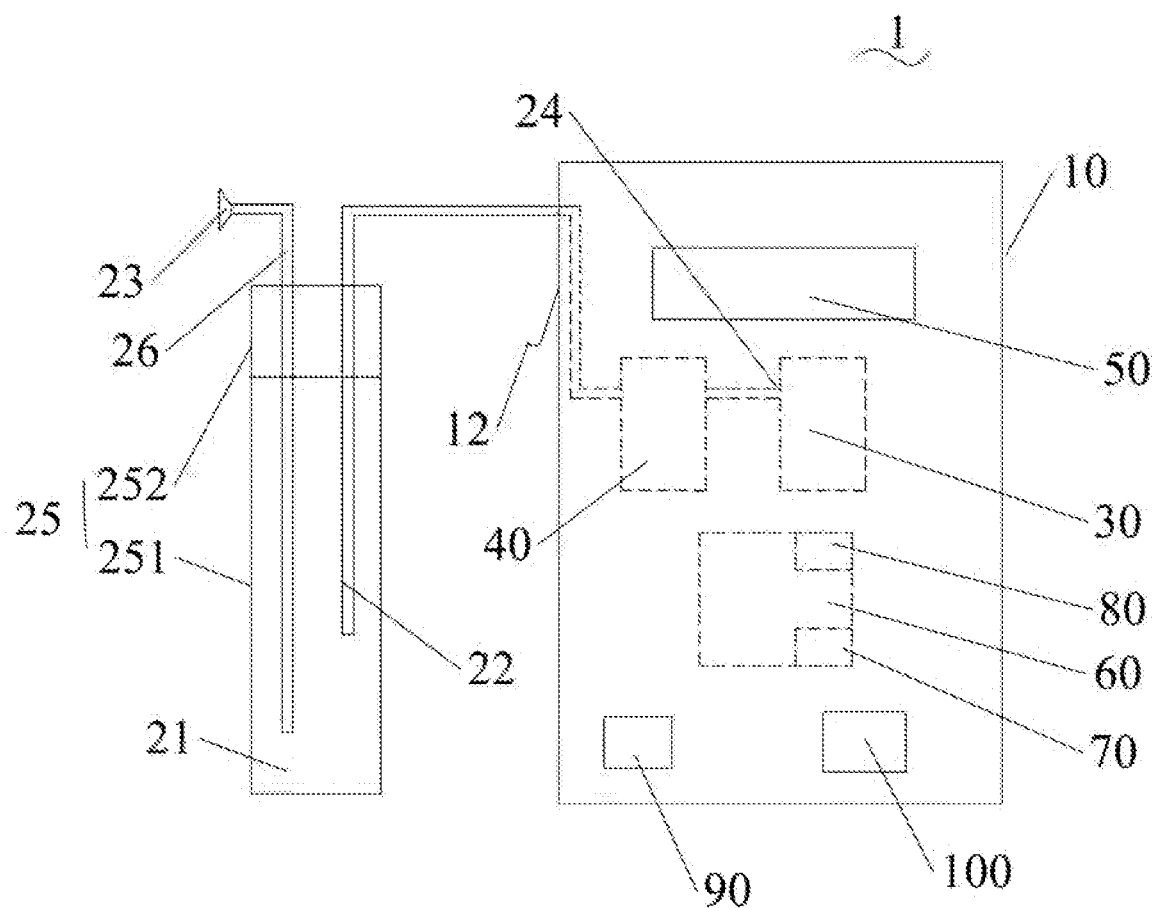
FIG. 1 is a structural schematic diagram of an air microorganism enrichment device in farms provided by the first embodiment.
Figure 2:
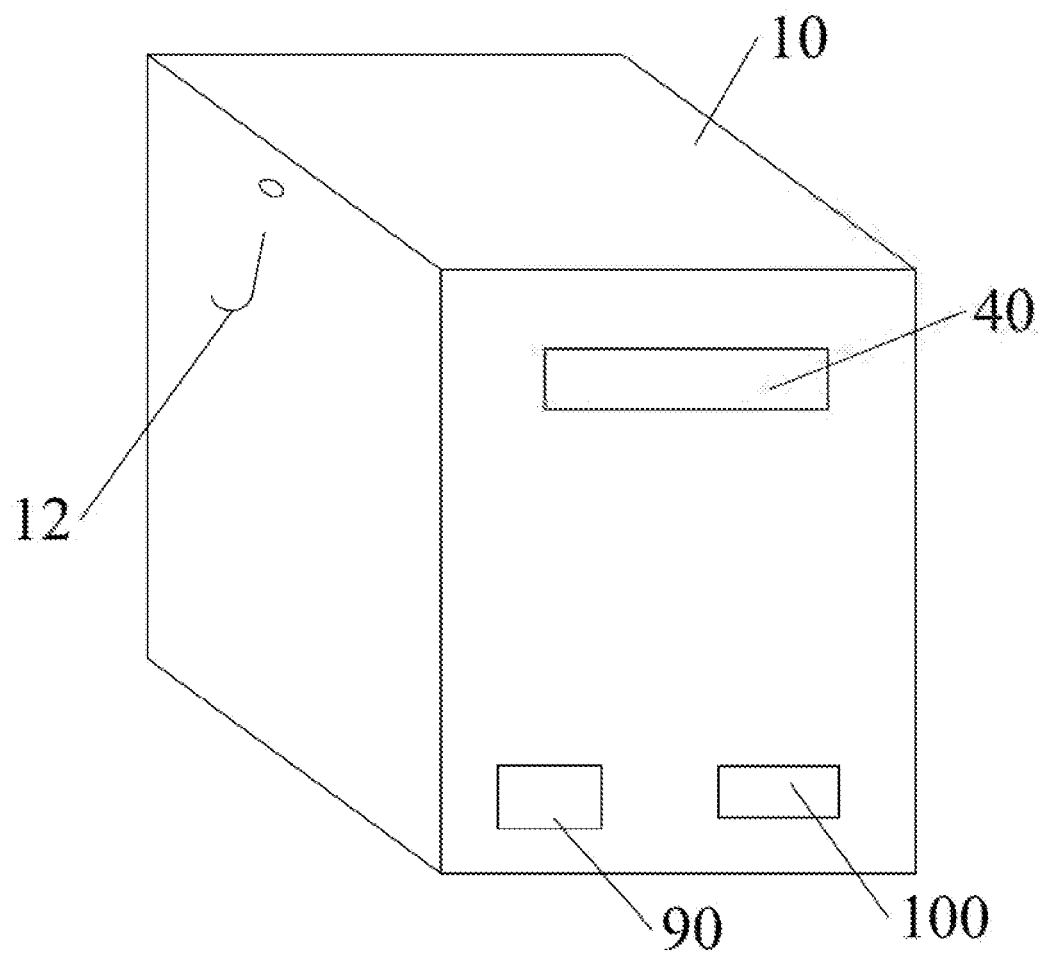
FIG. 2 is a structural schematic diagram of a shell provided by the first embodiment.
Figure 3:
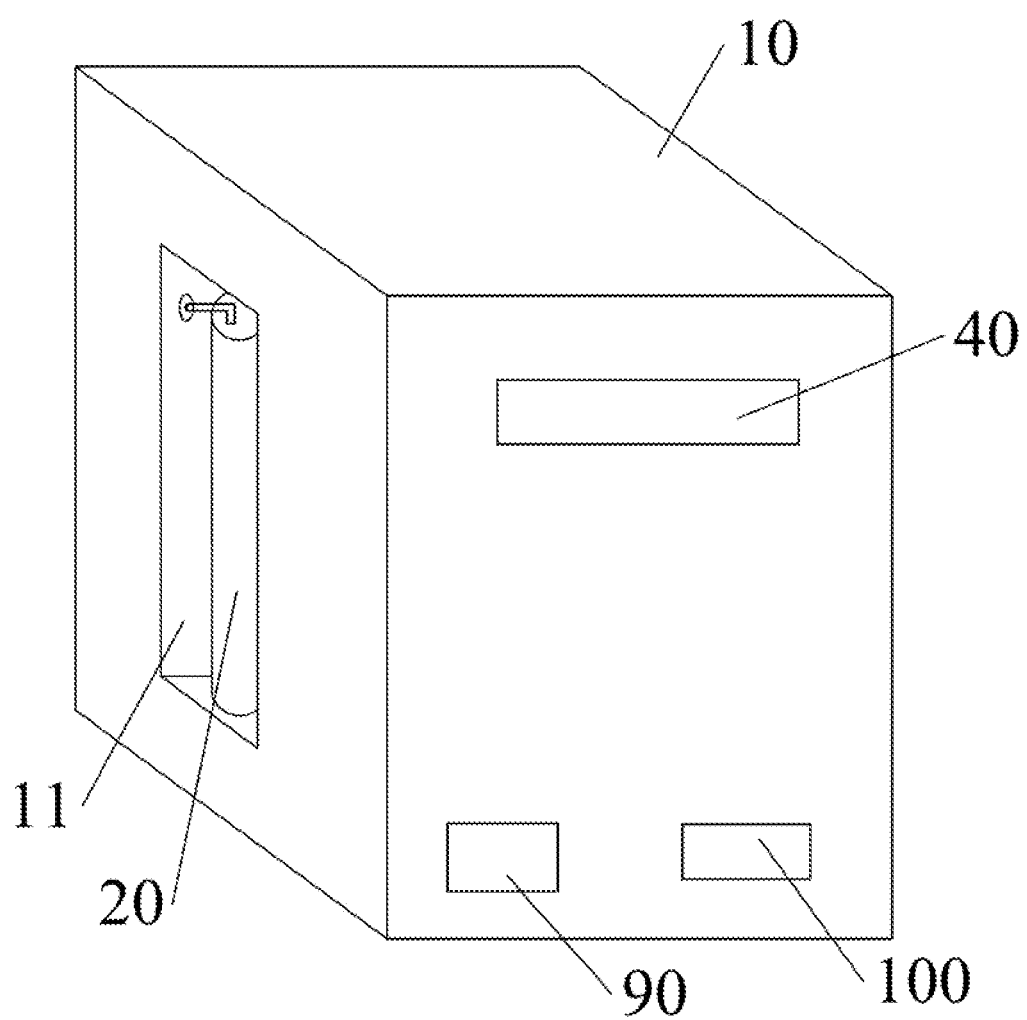
FIG. 3 is a structural schematic diagram of an air microorganism enrichment device in farms provided by the second embodiment.

The embodiment provides an air microorganism enrichment device 1 in farms. Referring to FIG. 1 and FIG. 2, the air microorganism enrichment device 1 in farms comprises a shell 10, a collection assembly 20, an air extraction component 30, a flow monitoring component 40, a display component 50 and a processing component 60. The collection assembly 20 is detachably arranged on the shell 10 and can fix the relative position with the shell 10. The collection assembly 20 is provided with a collection cavity 21 and an air outlet pipeline 22. The collection assembly 20 is provided with a collection air inlet 23 which communicates with the collection cavity 21 and is used for air to enter. One end of the air outlet pipeline 22 communicates with the collection cavity 21, and a collection air outlet 24 for discharging air is formed in the other end of the air outlet pipeline 22. The collection cavity 21 is used for collecting introduced microorganisms in air. The air extraction component 30 is arranged on the shell 10, and an air extraction opening of the air extraction component 30 is used for communicating with the collection air outlet 24. The flow monitoring component 40 is arranged on the air outlet pipeline 22 and used for monitoring the exhaust flow rate on the air outlet pipeline 22 and sending a flow signal. The display component 50 is arranged on the shell 10. The processing component 60 is arranged on the shell 10. The processing component 60 is in communication connection with the flow monitoring component 40 and the display component 50. The processing component 60 is used for receiving the flow signal and transmitting the flow signal to the display component 50 to display exhaust flow information.

The collection assembly 20 is detachably arranged on the shell 10 and can fix the relative position with the shell 10. When in use, the collection assembly 20 can be fixed on the shell 10, and then the position of the shell 10 in the farm can be fixed without additionally fixing the position of the collection assembly 20, or the collection assembly 20 is detached from the shell 10 to flexibly adjust the position of the collection assembly 20, or the microorganisms in the collection cavity 21 are detected after the collection assembly 20 is detached. In the using process, the air extraction component 30 operates to extract air, so that the collection air inlet 23 of the collection assembly 20 extracts air from the farm, and the microorganisms in the air are enriched into the collection cavity 21. Then, the air without microorganisms after being filtered is extracted through the air outlet pipeline 22 by the air extraction component 30. The flow monitoring component 40 monitors the exhaust flow rate in the air outlet pipeline 22 and transmits the exhaust flow rate to the processing component 60. The processing component 60 displays the exhaust flow information through the display component 50. The exhaust flow rate in the air outlet pipeline 22, namely the exhaust flow rate of the air extraction component 30, is convenient for operators to timely and accurately judge, so that the exhaust flow rate can meet the collection requirements. And then, the purposes of enriching air microorganisms in farms and facilitating pathogen detection are achieved, subsequent data processing such as microorganism content calculation is facilitated, and data support is provided for early warning and forecasting of pathogenic microorganisms in farms.

In the selectable scheme of the embodiment, preferably, the side wall of the shell 10 is fixedly provided with a first fixed component (not shown in the figures). The collection assembly 20 is provided with a second fixed component 12. The first fixed component and the second fixed component 12 are detachably connected and can fix the relative positions of the collection assembly 20 and the shell 10. Specifically, the first fixed component is set as a hanging ring and can be arranged on the collection bottle 25. The second fixed component 12 is set as a hook to facilitate connection. In addition, the first fixed component and the second fixed component 12 can be detachably connected by means of adhesion, magnetic adsorption and other manners.

Further, the air outlet pipeline 22 is set as a rubber hose and has a certain length so as to adjust the overall position of the collection assembly 20.

In the selectable scheme of the embodiment, preferably, the collection assembly 20 further comprises a collection bottle 25 and an air inlet pipeline 26. The collection bottle 25 is provided with the collection cavity 21, and the collection cavity 21 is used for accommodating collection liquid. One end of the air inlet pipeline 26 is the collection air inlet 23, and the other end of the air inlet pipeline 26 passes through the collection cavity 21 and extends into the collection liquid. The end, away from the collection air outlet 24, of the air outlet pipeline 22 extends into the collection cavity 21 and is located above the collection liquid. A liquid impact type air microorganism collection method is adopted, and the enrichment efficiency of microorganisms is good.

In the selectable scheme of the embodiment, preferably, the collection bottle 25 comprises a bottle body 251 and a bottle cap 252. The bottle cap 252 and the bottle body 251 are detachably arranged at an opening in the upper part of the bottle body 251 and can seal the opening, so that air is prevented from entering into the collection cavity 21 from the place which is not the air inlet pipeline 26 to generate interference. The air inlet pipeline 26 and the air outlet pipeline 22 pass through the bottle cap 252 in a sealed manner and extend into the collection cavity 21, so that air is prevented from entering into the collection cavity 21 from the place which is not the air inlet pipeline 26 to generate interference. Through the detachable connection between the bottle cap 252 and the bottle body 251, the installation and disassembly of the collection assembly 20 is facilitated, and the replacement of the collection liquid and the subsequent detection of microorganisms in the collection liquid are facilitated.

In the selectable scheme of the embodiment, preferably, the collection air inlet 23 of the air inlet pipeline 26 is set as a bell mouth with a large-diameter end facing outward, so that the air is convenient to enter.

In the selectable scheme of the present disclosure, preferably, an accommodating cavity is formed in the shell 10. The air extraction component 30, the flow monitoring component 40 and the processing component 60 are all arranged in the accommodating cavity. The shell 10 can play a protection role. The air outlet pipeline 22 passes through the shell 10 into the accommodating cavity and communicates with the air extraction component 30. A through hole for the air outlet pipe 22 to pass through is formed in the side wall of the shell 10 at a corresponding position.

Further, the air outlet pipeline 22 can be arranged into two sections, namely a first section and a second section. The first section is arranged in the accommodating cavity and communicates with the air extraction component 30 and the flow monitoring component 40, and one end of the first section passes through the side wall of the shell 10 so as to communicate with the second section. The second section is arranged outside the containing cavity and communicates with the collection bottle 25. When in use, the first section and the second section can be connected with each other, and the collection bottle 25 can be conveniently taken away, so that the air outlet pipeline 22 does not need to be completely drawn out.

Further, a door opening and closing structure can be arranged on one side wall of the shell 10, so that internal components are convenient to maintain.

In the selectable scheme of the present disclosure, preferably, the air microorganism enrichment device 1 in farms further comprises a timing module 70. The timing module 70 is arranged in the accommodating cavity and is in communication with the processing component 60. The timing module 70 is used for timing the air extraction component 30. The single opening time or the opening time interval of the air extraction component 30 can be controlled, and the corresponding opening time can be displayed by the display component 50, so that the whole device meets the use requirements more intelligently.

In the selectable scheme of the present disclosure, preferably, the air microorganism enrichment device 1 in farms provided by the embodiment further comprises a power supply module 80. The power supply module 80 is arranged in the accommodating cavity and used for providing electric energy require by the air extraction component 30, the flow monitoring component 40, the display component 50, the processing component 60 and the timing module 70, and an external power supply is not needed, so that the using flexibility is improved.

Specifically, the air extraction component 30 can be set as an air pump. The flow monitoring component 40 can set as a gas flow sensor. The display component 50 can be set as a display screen. The processing component 60 can be set as a control chip. The timing module 70 and the power supply module 80 can be integrated into the processing component 60.

Further, the power supply module 80 can be a storage battery, and can also be provided with a photovoltaic module. The photovoltaic module is a solar cell module and is arranged on the outer wall of the shell 10. The photovoltaic module is in communication connection with the processing component 60, and is used for charging the power supply module 80 or directly providing electric energy required by the air extraction component 30, the flow monitoring component 40, the display component 50, the processing component 60 and the timing module 70.

In the selectable scheme of the present disclosure, preferably, the air microorganism enrichment device 1 in farms further comprises a switch button 90 and a timing button 100 which are arranged on the shell 10. Both the switch button 90 and the timing button 100 are in communication connection with the processing component 60. The air extraction component 30 is in communication connection with the processing component 60. The switch button 90 is used for controlling the opening and closing of the air extraction component 30. The timing button 100 is used for controlling the single opening time or the opening time interval of the air extraction component 30, so that the control of the operators is facilitated.

Embodiment II

The embodiment provides an air microorganism enrichment device 1 in farms. The difference between the air microorganism enrichment device 1 in farms provided by the embodiment and the air microorganism enrichment device 1 in farms provided by the first embodiment lies in that a placing groove 11 is formed in the side wall of the shell 10, and the collection assembly 20 can be placed in the placing groove 11 and fix the relative position with the shell 10. At the same time, the relative position of the collection assembly 20 and the shell 10 is convenient to collect so as to flexibly adjust the collection position of the collection assembly 20, and a through hole for the air outlet pipe 22 to enter the shell 10 is formed in the side wall of the placing groove 11.

The rest of the structure of the air microorganism enrichment device 1 in farms provided in the embodiment is the same as that in the first embodiment, and is not repeated here.

Specific examples are used for illustration of the principles and implementation methods of the present disclosure. The description of the above-mentioned embodiments is used to help illustrate the method and its core principles of the present disclosure. In addition, those skilled in the art can make various modifications in terms of specific embodiments and scope of application in accordance with the teachings of the present disclosure. In conclusion, the content of this specification shall not be construed as a limitation to the present disclosure.

What is claimed is:

1. An air microorganism enrichment device in farms, comprising:
    a shell (10);
    a collection assembly (20), the collection assembly being detachably arranged on the shell (10) and being capable of fixing the relative position with the shell (10), the collection assembly (20) being provided with a collection cavity (21) and an air outlet pipeline (22), the collection assembly (20) being provided with a collection air inlet (23) which communicates with the collection cavity (21) and is used for air to enter, one end of the air outlet pipeline (22) communicating with the collection cavity (21), a collection air outlet (24) for discharging air being formed in the other end of the air outlet pipeline (22), and the collection cavity (21) being used for collecting introduced microorganisms in air;
    an air extraction component (30), the air extraction component (30) being arranged on the shell (10), and an air extraction opening of the air extraction component (30) being used for communicating with the collection air outlet (24);
    a flow monitoring component (40), the flow monitoring component (40) being arranged on the air outlet pipeline (22) and used for monitoring the exhaust flow rate on the air outlet pipeline (22) and sending a flow signal;
    a display component (50), the display component (50) being arranged on the shell (10); and
    a processing component (60), the processing component (60) being arranged on the shell (10), the processing component (60) being in communication connection with the flow monitoring component (40) and the display component (50), and the processing component (60) being used for receiving the flow signal and transmitting the flow signal to the display component (50) to display exhaust flow information;
    wherein a placing groove (11) is formed in the side wall of the shell (10), and the collection assembly (20) can be placed in the placing groove (11) and fix the relative position with the shell (10).

2. The air microorganism enrichment device in farms according to claim 1, wherein the side wall of the shell (10) is fixedly provided with a first fixed component, the collection assembly (20) is provided with a second fixed component (12), and the first fixed component and the second fixed component (12) are detachably connected and can fix the relative positions of the collection assembly (20) and the shell (10).

3. The air microorganism enrichment device in farms according to claim 1, wherein the collection assembly (20) further comprises a collection bottle (25) and an air inlet pipeline (26), the collection bottle (25) is provided with the collection cavity (21), and the collection cavity (21) is used for accommodating collection liquid; one end of the air inlet pipeline (26) is the collection air inlet (23), the other end of the air inlet pipeline (26) passes through the collection cavity (21) and extends into the collection liquid, and the end, away from the collection air outlet (24), of the air outlet pipeline (22) extends into the collection cavity (21) and is located above the collection liquid.

4. The air microorganism enrichment device in farms according to claim 3, wherein the collection bottle (25) comprises a bottle body (251) and a bottle cap (252), the bottle cap (252) and the bottle body (251) are detachably arranged at an opening in the upper part of the bottle body (251) and can seal the opening; and the air inlet pipeline (26) and the air outlet pipeline (22) pass through the bottle cap (252) in a sealed manner and extend into the collection cavity (21).

5. The air microorganism enrichment device in farms according to claim 4, wherein the collection air inlet (23) of the air inlet pipeline (26) is set as a bell mouth with a large-diameter end facing outward.

6. The air microorganism enrichment device in farms according to claim 1, wherein an accommodating cavity is formed in the shell (10), the air extraction component (30), the flow monitoring component (40) and the processing component (60) are all arranged in the accommodating cavity, and the air outlet pipeline (22) passes through the shell (10) into the accommodating cavity and communicates with the air extraction component (30).

7. The air microorganism enrichment device in farms according to claim 6, further comprising a timing module (70), wherein the timing module (70) is arranged in the accommodating cavity and is in communication with the processing component (60), and the timing module (70) is used for timing the air extraction component (30) and displaying the timing through the display component (50).

8. The air microorganism enrichment device in farms according to claim 7, further comprising a power supply module (80), wherein the power supply module (80) is arranged in the accommodating cavity and used for providing electric energy required by the air extraction component (30), the flow monitoring component (40), the display component (50), the processing component (60) and the timing module (70).

9. The air microorganism enrichment device in farms according to claim 8, further comprising a switch button (90) and a timing button (100) which are arranged on the shell (10), wherein both the switch button (90) and the timing button (100) are in communication connection with the processing component (60), the air extraction component (30) is in communication connection with the processing component (60), the switch button (90) is used for controlling the opening and closing of the air extraction component (30), and the timing button (100) is used for controlling the opening and closing time of the air extraction component (30).

\* \* \* \* \*